April 12, 1966 M. R. BOYD ETAL 3,246,190
FLUID COOLED TRAVELING WAVE TUBE
Filed June 28, 1961 3 Sheets-Sheet 1

INVENTORS
MERLE R. BOYD
FRANK M. HENDRY
RUSSELL T. MANNETTE
BY
ATTORNEY

April 12, 1966   M. R. BOYD ETAL   3,246,190
FLUID COOLED TRAVELING WAVE TUBE
Filed June 28, 1961   3 Sheets-Sheet 2

INVENTORS
MERLE R. BOYD
FRANK M. HENDRY
RUSSELL T. MANNETTE

BY Joseph D. Pannone
ATTORNEY

April 12, 1966  M. R. BOYD ETAL  3,246,190
FLUID COOLED TRAVELING WAVE TUBE
Filed June 28, 1961  3 Sheets-Sheet 3
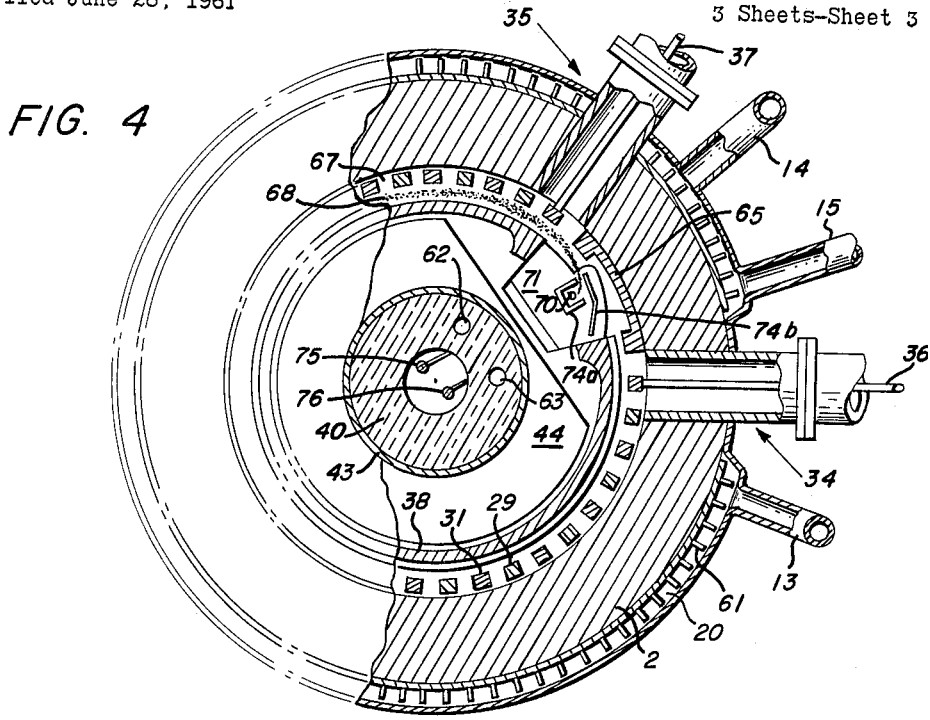
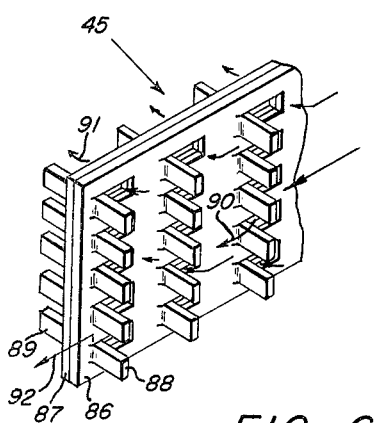
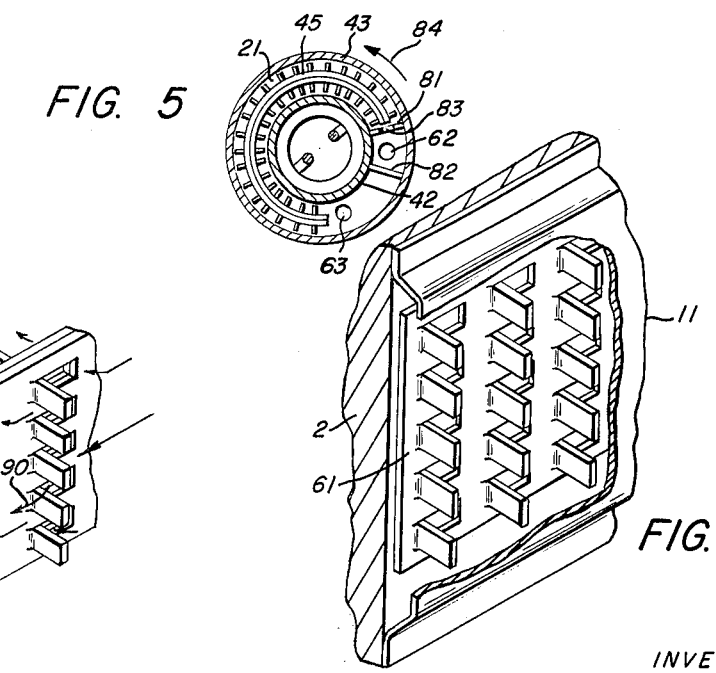
INVENTORS
MERLE R. BOYD
FRANK M. HENDRY
RUSSELL T. MANNETTE
BY Joseph D. Parmore
ATTORNEY

United States Patent Office 3,246,190
Patented Apr. 12, 1966

3,246,190
FLUID COOLED TRAVELING WAVE TUBE
Merle R. Boyd, Auburndale, and Frank M. Hendry and Russell T. Mannette, Framingham, Mass., assignors to Raytheon Company, Lexington, Mass., a corporation of Delaware
Filed June 28, 1961, Ser. No. 120,215
6 Claims. (Cl. 313—32)

This invention relates to systems for cooling electrodes in an electron discharge device and more particularly for maintaining the slow wave propagating structure and opposing electrode in a traveling wave tube at substantially the same temperature so that relative dimensions and spacing between the structure and electrode are maintained over a wide range of operating conditions.

Certain types of cross-field traveling wave tubes include an elongated electrode coextensive with the wave propagating structure defining an interaction space therebetween. This electrode sometimes called the sole is energized at a different D.C. potential than the structure to produce a transverse electric field in the interaction space which cooperates with a transverse magnetic field to compel electrons to travel therethrough in energy exchanging relationship with waves propagating in the structure. It is well known in the art that the velocity of beam electrons is controlled by the ratio of the strengths of the electric and magnetic fields. Furthermore, in a traveling wave amplifier the efficiency of interaction between the beam and the waves propagating in the structure requires synchronism between the beam velocity and the phase velocity of the wave. Having selected a slow wave structure and a desired frequency of operation, the phase velocity is established, and it is then a problem to establish a beam velocity to obtain the desired synchronism necessary for interaction. Similarly, in a traveling wave oscillator, sometimes called a backward wave oscillator, output frequency is also established by beam velocity.

As is well known in the art, beam velocity is determined by the ratio of strengths of the transverse electric to magnetic fields in the interaction space, sometimes denoted $E/B$. This ratio is usually varied to tune the tube by varying E. It is preferred to vary E rather than B because E can be more precisely controlled over a wider range by controlling power supply voltage coupled to the sole electrode. In order to insure repeatability of tuning over a range of ambient conditions and to stabilize operation as quickly as possible upon starting the tube, it is essential that the electric field E remain the same for a given control voltage over a range of ambient and operating conditions. The electric field E is most likely to vary as a result of changes in the spacing between the delay structure and the sole electrode brought about by thermal expansions. In other words, it is essential that thermal expansion of the slow wave structure and the sole electrode does not alter a calibration of control voltage versus frequency (established by electric field E) over the range of ambient and operating conditions. Heretofore, a solution to this problem has been attempted by maintaining the slow wave structure at a constant temperature while the tube is operated over a range of ambient temperatures. This was possible because the structure was usually attached to the tube envelope so that the envelope could be cooled externally to thereby cool the structure by thermal conduction. However, no attempt was made to cool the sole electrode directly because it was contained within the envelope of the tube and insulated therefrom.

Therefore, it is one object of the present invention to provide a system for cooling both the slow wave structure and sole electrode in a traveling wave tube to thereby insure frequency, stability and/or calibration as soon as possible after starting the tube and while the tube is operated over a wide range of ambient temperatures. It is another object to provide a system for maintaining the slow wave structure and sole wave structure and sole electrode in a cross-field type traveling wave tube at substantially the same temperature to thereby insure frequency stability and/or calibration of the tube as soon as possible after starting the tube and during operation over a wide range of ambient temperatures.

In a preferred embodiment of the present invention the slow wave structure is attached to the envelope wall, and the sole electrode is supported within the envelope in suitable relationship with the structure from a ceramic plug which seals to the envelope walls. Separate fluid conduits are disposed in thermally conductive relationship with the structure and the sole electrode. These conduits are connected together externally so that the fluid flows between them to maintain the structure and the sole electrode at substantially the same temperature.

It is an additional feature of the present invention to locate one conduit along the outside walls of the envelope close to the slow wave structure so that heat may be readily conducted therebetween and to dispose another conduit within the envelope of the tube close to the sole electrode and connecting to passages in the ceramic support permitting the fluid to enter and leave exchanging heat with the sole electrode.

In another embodiment of the present invention fluid enters one end of the first conduit exchanging heat with the slow wave structure and flows out of two openings at the other end of the first conduit. The first of these two openings connects to one of the passages through the ceramic support, permitting part of the fluid to flow from the first conduit into the second conduit exchanging heat with the sole electrode. The remaining part of the fluid leaves the first conduit through the other of the two openings and flows through a restriction into a junction where it mixes with the flow from the second conduit, then proceeds to an outlet sump.

It has been found convenient to establish pressure drop in the system and to establish an optimum balance of flow through the two conduits by varying the size of the restriction.

Other features and objects of the present invention will be more apparent from the following description of a specific embodiment of the invention taken in conjunction with the drawings in which:

FIG. 4 illustrates another sectional view 4—4 of the tube in FIG. 1 taken perpendicular to the plane of FIG. 1 along the heavy dot-dash lines shown in FIG. 3;

FIG. 5 illustrates a bottom view of the ceramic support member showing the second conduit associated with the sole electrode; and FIGS. 6a and 6b illustrate an arrangement of baffles which are disposed in the first and second conduits in intimate thermal contact with the fluid and the structure or electrode.

Figure 1:
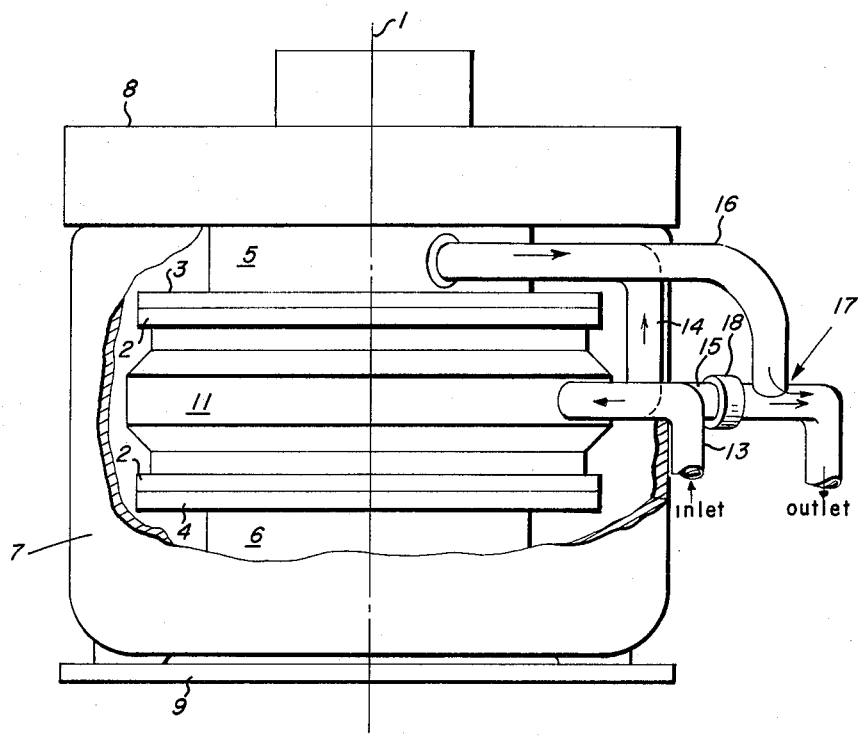
FIG. 1 illustrates a crossed-field traveling wave tube with a circular interaction space having part of the magnet broken away to show inlet and outlet tubes for the fluid.

Turning first to FIG. 1 there is shown a crossed-field traveling wave tube in which the slow wave structure and the sole electrode are circular and disposed concentric to each other forming a circular interaction space about the tube axis 1. The envelope of the tube is formed by anode cylinder 2 to which the slow wave structure is attached, upper cover 3, and lower cover 4. Magnetic pole pieces 5 and 6 extend from the upper and lower covers to the magnet 7 in which is shown broken away to permit a view of the envelope and the arrangement of tubes that conduct fluid into and out of the system. An opening is provided in upper cover 3 along the axis 1, and mounting plate 8 slidably seals to a sleeve fixed to this opening while a ceramic plug admitting terminal leads is rigidly sealed to the sleeve and supports the sole electrode within the envelope. This arrangement permits the envelope to expand in the direction of the axis 1 without binding by the magnet and mounting plates 8 and 9. It also facilitates assembly.

An anode jacket 11 is sealed to the outside wall of anode clinder 2 and shaped to enclose a fluid conduit along the outer perimeter of the anode cylinder through which fluid may be forced to cool or heat the anode cylinder and thus maintain the slow wave propagating structure at a given temperature. The magnet and mounting plate 8 and lower plate 9 are assembled and held together by tubes which pass through mounting plate 8 down the length of the magnet and through the lower plate 9 and are flanged at both ends to secure the plates to the magnet.

Fluid is introduced to an inlet tube 13 which connects to the anode jacket 11 at one end of the jacket. Two tubes 14 and 15 are attached to the other end of the anode jacket, each carrying out part of the fluid that enters tube 13. Tube 14 carriers part of the fluid through an opening in magnetic pole piece 5 and into a second conduit within the envelope of the tube for exchanging heat with the sole electrode. Tube 16 also connects to the second conduit within the envelope of the tube and carries fluid from the second conduit into a junction 17. The junction 17 is connected to tube 15 by restriction 18 and serves to combine the part of the flow which has coursed through the inner conduit with the remaining part which has coursed only through the outer conduit formed by the anode jacket, returning both flows to an outlet.

Figure 2:
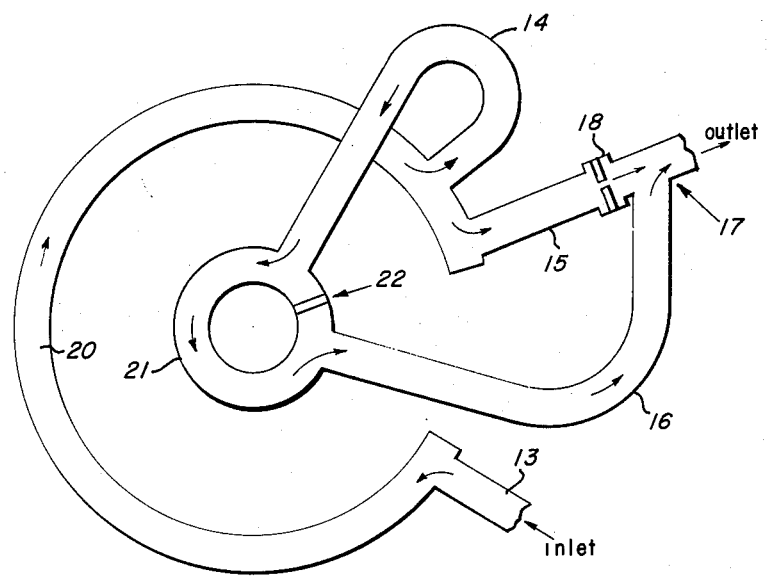
FIG. 2 is a diagrammatical sketch showing the conduits associated with the slow wave structure and the sole electrode and connections therebetween whereby flow to each may be controlled.

The diagram in FIG. 2 illustrates the connections between the various of the tubes to show the path followed by the fluid as it courses through the first and second conduits to exchange heat with the slow wave structure and the sole electrode. As shown in FIG. 2 the fluid enters an inlet via tube 13 and passes through the first conduit 20 which is formed by the space between anode jacket 11 and the anode cylinder 2 (See FIG. 1). At the other end of conduit 20 the fluid is divided into two parts, one of which flows through tube 14 and into the second or inner conduit 21 for exchanging heat with the sole electrode inside the tube. A flow separator 22 is provided in conduit 21 so that fluid entering one end proceeds over almost a complete circle and emerges at the other end entering tube 16 and is conducted through tube 16 to junction 17 where it merges with the remaining part of the fluid which has coursed only through the first conduit 20. The restriction 18 serves to control said remaining part of the fluid and thereby controls the portion of the fluid entering tube 13 which is directed through both the conduits 20 and 21.

The above-described arrangement for controlling fluid flow affords two control parameters which can be varied somewhat independently to insure that the slow wave structure and the sole electrode are maintained at substantially the same temperature or at a substantially constant temperature differential, to thereby accomplish some of the objects of the invention.

Figure 3:
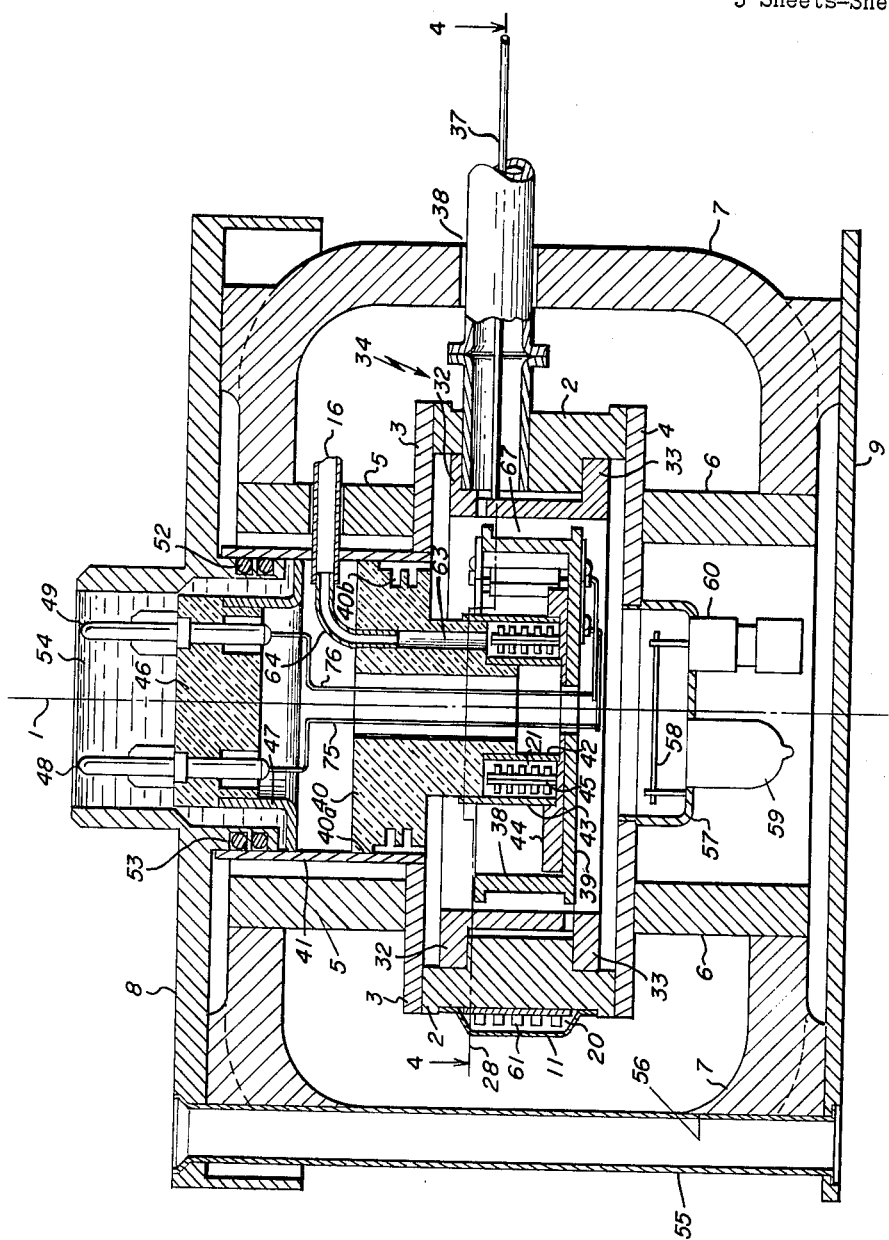
FIG. 3 illustrates a sectional view of the tube of FIG. 1 taken through the plane of FIG. 1.

Turning next to FIG. 3 there is shown a sectional view of the tube of FIG. 1 taken through the axis 1 in the plane of FIG. 1 to shown the annular conduits 20 and 21. The details of the structure shown in FIG. 3 are best described with reference also to the cross-sectional view shown in FIG. 4 which is also a cross-section of the device of FIG. 1 but taken perpendicular to the plane of FIG. 1 through the dot-dash line 28.

The slow wave structure is formed of interleaved fingers such as 29 and 31 projecting from upper and lower crowns 32 and 33, respectively. The crowns are generally ring shaped and are attached to the anode cylinder 2 to provide intimate thermal and electrical contact therewith and the fingers attached to each crown project toward the opposite crown to form an interdigital type slow wave propagating structure. Wave energy is coupled to or from this structure by coaxial type connectors such as 34 and 35 which are inserted into openings in the anode cylinder 2 and which have their center conductors 36 and 37 connected to fingers at opposite ends of the structure. Openings such as 38 are provided in magnet 7 to accommodate the coaxial connectors 34 and 35. The wave propagating structures of this type are generally termed no-wave-reentrant because the ends are uncoupled.

The sole electrode 38 is generally cylindrical in shape with one end partly closed by annular plate 39. A ceramic plug 40 is inserted into the open end of this cylindrical sole and supports the sole by attachement to the plate 39 thereof. The ceramic plug is in turn supported by attachment to outer sleeve 41 which is generally cylindrical in shape and is attached to the opening in the upper cover plate 3.

The conduit 21 which carries fluid for cooling or heating the sole electrode is formed by inner sleeve 42 and middle sleeve 43 both of which are generally cylindrical in shape and disposed cencentric with the axis 1 of the tube and attached to the ceramic plug 40 as shown. Sleeves 42 and 43 are also attached to thermal plate 44 which covers the annular space of the conduit 21 formed by the sleeves and ceramic plug.

The thermal plate 44 is preferably mounted in contact with a large surface portion of the sole electrode 38 so as to readily conduct heat to or from the sole and accordingly, is attached over a large area to the annular plate 39 which partially closes one end of the cylindrical sole. In order to increase thermal conduction from thermal plate 44 to the fluid in conduit 21, baffle structure 45 is provided inside the conduit. The baffle structure is preferably of copper or material of high thermal conductivity and is attached to and supported by thermal plate 44. This structure is described in more detail below with reference to FIGS. 5 and 6.

As mentioned above, the ceramic plug 40 is sealed to outer sleeve 41 which is attached to the opening in upper cover plate 3. Sealing is accomplished by, for example, flashing a thin layer of metal along the edge 40a of the ceramic plug and then brazing the edge to the inside of the sleeve 41. Notches 40b in ceramic plug 40 serve to increase the electrical leakage path from the sole electrode 38 which is at a negative potential to sleeve 41 which is at anode potential. The leakage occurs through the deposition on the ceramic plug of metal vapor generated within the tube.

Ceramic header 46 is sealed in substantially the same manner to header sleeve 47 which is in turn brazed to the inside of outer sleeve 41. Five terminals such as 48 and 49 mounted in the header are provided for carrying electrical leads to the sole electrode and the cathode gun which includes two beam forming electrodes, an electron emissive body and a heater. As a result, the ceramic header 46, header sleeve 47, outer sleeve 41, ceramic plug 40 and upper cover 3 form a vacuum-tight rigid construction.

As already mentioned, the mounting plate 8 is slidably attached to the upper end of outer sleeve 41 and is sealed against the sleeve by O-rings 52 which are compressed within grooves 53 in the mounting plate. The slidable mount permits some expansion of outer sleeve 41 as the tube heats during operation and the O-rings provide a liquid-tight seal so that the terminals such as 48 and 49 projecting from the ceramic header 47 may be immersed in a fluid such as oil 54 having characteristics to prevent arcing between the terminals. The mounting plate 8 is fixed to the lower plate 9 by tubes such as 55 flared at both ends as shown. Suitable openings such as 56 are provided in magnet 7 to permit passage of the tubes 55 substantially parallel to axis 1. The tubes 55 securely fasten the mounting plate 8, lower plate 9 and magnet 7 together sandwiching the tube assembly between magnetic pole pieces 5 and 6, the tube assembly being slidably attached to the mounting plate 8 as already described.

An opening in lower cover plate 4 coaxial with the axis 1 is covered with adapter sleeve 57 which encloses a getter 58 and includes a pinched off exhaust tube 59 and a getter feed-through 60 by which a suitable potential is applied to the getter.

As described above with reference to FIGS. 1 and 2 fluid is introduced to a first conduit 20 in thermal relationship with the slow wave structure by way of tubing 13 shown in detail in FIG. 4. The fluid flows the length of conduit 20 exchanging heat with the anode cylinder 2 which in turn conducts heat to or from the upper and lower crowns 32 and 33, thereby maintaining the wave propagating structure at a given temperature. Intimate thermal contact between the fluid and the anode cylinder 2 is insured by one set of baffles 61 which are attached to the anode cylinder within the conduit 20. The fluid leaving conduit 20 is split into two flows, one through tube 14 and the other through tube 15. Tube 14 passes through an opening in magnetic pole piece 5 and feeds into hole 62 which is disposed longitudinally in ceramic plug 40. Hole 62 conducts the fluid into conduit 21 extracting heat from the sole electrode which flows through thermal plate 44 and double baffles 45 immersed in the conduit. The fluid then flows out of conduit 20 through hole 63 also disposed longitudinally within the ceramic plug, through elbow tube 64 and into tube 16. Consequently, as already described with reference to FIG. 2, all the fluid flows through conduit 20 exchanging heat with the slow wave structure, whereupon it splits into two flows, one proceeding to conduit 21 to exchange heat with the sole electrode and the other proceeding through an orifice restriction where it joins the flow from conduit 21 and proceeds to an outlet sump. As shown in FIG. 4 the coolant flows at least throughout the length of anode cylinder 2 which supports the slow wave structure. The anode block 65 is disposed between the upper and lower crowns 32 and 33 completing the circle formed in part by the fingers of the structure and serves to bound an electric field with the sole electrode at the beginning and end of the interaction space 67 through which the beam 68, issuing from the cathode gun, flows block 65 also collects beam electrons which are not collected by the slow wave structure.

The cathode gun as shown in FIG. 4 consists of an electron emissive body 70 insulatedly supported between plates such as 71 which are in turn mounted to the sole electrode 38. Beam forming electrodes 74a and 74b are mounted to plates 71 by insulators. A plurality of cathode gun leads such as 75 and 76 are connected to the terminal posts and brought through the center of the ceramic plug 40 and annular plate 39 to the cathode gun. A similar lead attaches to the sole electrode. These leads provide all operating voltages to the tube.

As mentioned above with respect to FIG. 2, flow separator 22 in conduit 21 is provided to direct the flow of fluid around the conduit and out through hole 63 in a given direction through the conduit. The separator 22 might be constructed as shown in FIG. 5 including two plates 81 and 82 on either side of hole 62 through which the fluid enters. An opening 83 in plate 81 permits the entering fluid to flow through conduit 21 in the direction of arrow 84 to hole 63 by which the fluid leaves the conduit and flows to tube 16.

FIGS. 6a and 6b illustrate the structure of the double baffle 45 in conduit 21 and the single baffle 61 in conduit 20. The double baffle might, for example, be constructed of two sheets such as 86 and 87 attached back to back each containing baffle fingers such as 88 and 89 cut from the surface of the sheets and raised as shown. This construction permits the flow of fluid through the sheets as illustrated by arrows 90 and 91 as well as around the baffle fingers as illustrated by arrows 92. The baffle fingers add turbulence to the flowing fluid, which causes some of the fluid to flow in and out of the holes between the plates, insuring a more thorough transfer of heat between the fluid and the baffles. The single baffle 61 shown at FIG. 6b for exchanging heat with the slow wave structure merely adds turbulence to the flow and increases the area of thermal contact between the fluid and the thermally conductive structure attached to the slow wave structure.

The applicant has discovered that a fluid identified as Dow Corning No. 200 having a viscosity of 20 centistokes at 25° C. may serve quite well to maintain the slow wave structure and sole electrode at substantially the same temperature throughout start and as the tube is operated over a wide range of ambient temperatures. For example, a tube designed substantially as described herein for operation at about 3500 megacycles as a backward wave oscillator can be stabilized to within a few megacycles a minute after starting. Such performance is possible over an ambient temperature range extending from well below zero to above 100° C.

While there are described herein specific embodiments of the present invention, it is to be clearly understood that these embodiments are made only by way of example to illustrate applications of the invention and should not limit the spirit and scope of the invention as set forth in the accompanying claims.

What is claimed is:

1. In an electron discharge device including at least two electrodes, means for maintaining said electrodes at substantially the same temperature comprising a first fluid conduit having two ends for conducting fluid in heat exchanging relationship with one of said electrodes, a second fluid conduit having two ends for conducting fluid in heat exchanging relationship with another of said electrodes, means conducting fluid to one end of said first conduit, means conducting at least a portion of said fluid from the other end of said first conduit to one end of said second conduit, means at the other end of said second conduit for conducting said portion to a flow junction, and means including a flow restriction at the other end of said first conduit for conducting the rest of said fluid to said junction to join flow from said second conduit whereby said electrodes are maintained at predetermined temperatures.

2. In an electron discharge device including a slow wave propagating structure, an elongated electrode coextensive with the structure defining an interaction space therebetween, an envelope enclosing said structure and elongated electrode, electrically conductive means mounting said slow wave structure to said envelope, and electrically insulating means mounting said elongated electrode to said envelope; means for maintaining said structure and electrode at predetermined temperatures comprising a first fluid conduit attached to the outside of said envelope in thermally conductive relationship with said structure, a second fluid conduit attached inside said envelope in thermally conductive relationship with said elongated electrode, and means interconnecting said first and second conduits whereby fluid flows therebetween to maintain said structure and electrode at given predetermined temperatures.

3. In an electron discharge device including a slow wave propagating structure, an elongated electrode coextensive with the structure defining an interaction space therebetween, an envelope enclosing said structure and elongated electrode, electrically conductive means mounting said slow wave structure to said envelope and electrically insulating means mounting said elongated electrode to said envelope; means for maintaining said structure and electrode at predetermined temperatures comprising a first fluid conduit having two ends attached to the outside of said envelope in thermally conductive relationship with said structure, a second fluid conduit having two ends attached inside said envelope in thermally conductive relationship with said elongated electrode, means conducting fluid to one end of said first conduit, means conducting fluid from the other end of said first conduit to one end of said second conduit, means at the other end of said second conduit for conducting fluid to a flow junction, and means at the other end of said first conduit for conducting fluid to said junction to join flow from said second conduit.

4. In an electron discharge device including a slow wave propagating structure, an elongated electrode coextensive with the structure defining an interaction space therebetween, an envelope enclosing said structure and elongated electrode, electrically conductive means mounting said structure to said envelope, and electrically insulating means mounting said elongated electrode to said envelope; means maintaining said structure and electrode at predetermined temperatures comprising a first fluid conduit having two ends attached to the outside of said envelope in thermally conductive relationship with said structure, a second fluid conduit having two ends attached inside said envelope in thermally conductive relationship with said elongated electrode, means conducting fluid to one end of said first conduit, means conducting at least a portion of said fluid from the other end of said first conduit to one end of said second conduit, means at the other end of said second conduit for conducting said portion to a flow junction, and means including a flow restriction at the other end of said first conduit for conducting the rest of said fluid to said junction to join flow from said second conduit whereby said electrodes are maintained at said predetermined temperatures.

5. In an electron discharge device embodying at least two electrodes, cooling means for said electrodes comprising a first coolant conduit for conducting fluid in heat exchanging relationship with one of the electrodes, a second coolant conduit for conducting fluid in heat exchanging relationship with a second electrode, each of said conduits having inlet and outlet ends, a third conduit connected at one end adjacent the outlet end of the first conduit and connected at its other end to the inlet end of the second conduit, an exhaust tube connected to the outlet end of the first conduit, a fourth conduit connected at one end to the outlet end of the second conduit and at its other end to the exhaust tube, and a restriction within the exhaust tube between the second conduit and the junction between the tube and fourth conduit whereby a portion of the fluid in the first conduit is forced through the third, second and fourth conduits respectively.

6. In an electron discharge device including a slow wave propagating structure, an elongated electrode coextensive with the structure defining an interaction space therebetween, an envelope enclosing said structure and elongated electrode, electrically conductive means mounting said slow wave structure to the envelope, and electrically insulating means mounting said elongated electrode to the envelope; means for maintaining said structure and electrode at predetermined temperatures comprising a first fluid conduit attached to the outside of said envelope in thermally conductive relationship with said structure, a second fluid conduit attached inside said envelope in thermally conductive relationship with said elongated electrode, each of said conduits having inlet and outlet ends, a third conduit connected at one end adjacent the outlet end of the first conduit and connected at its other end to the inlet end of the second conduit, an exhaust tube connected to the outlet end of the first conduit, a fourth conduit connected at one end to the outlet end of the second conduit and at its other end to the exhaust tube, and restriction within the exhaust tube between the second conduit and the junction between the tube and fourth conduit whereby a portion of the fluid in the first conduit is forced through the third, second and fourth conduits respectively.

References Cited by the Examiner

UNITED STATES PATENTS

| 2,489,891 | 11/1949 | Hull | 313—32 X |
| 2,546,773 | 3/1951 | Nelson | 313—32 X |
| 3,029,361 | 4/1962 | Hernqvist | 315—3.5 X |

GEORGE N. WESTBY, *Primary Examiner.*

C. R. CAMPBELL, *Assistant Examiner.*